June 25, 1957  A. NADLER  2,796,718
LAWN MOWER HANDLE ATTACHMENT
Filed Feb. 25, 1955
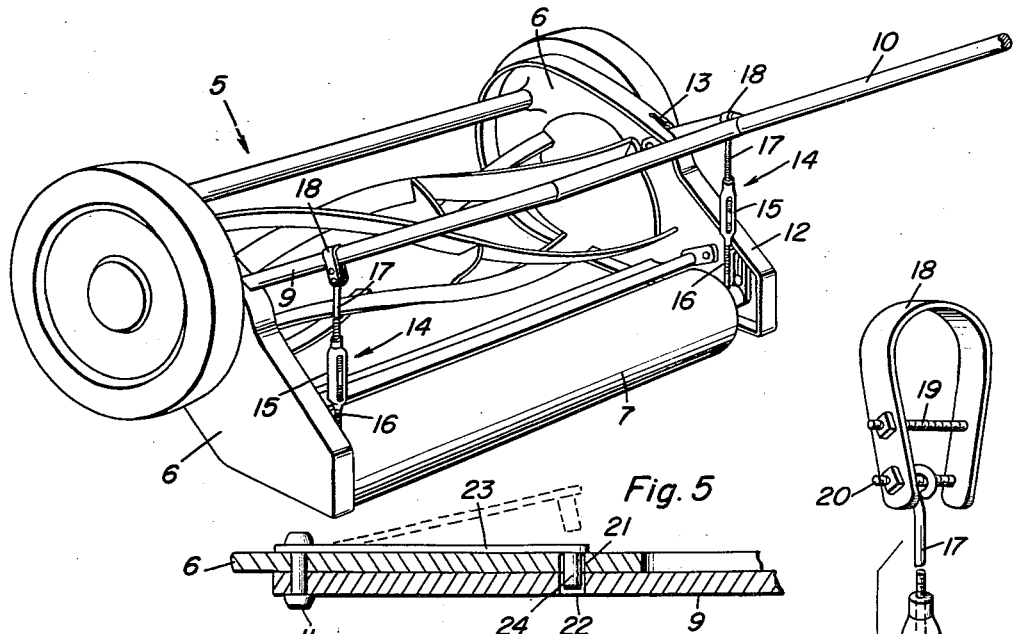
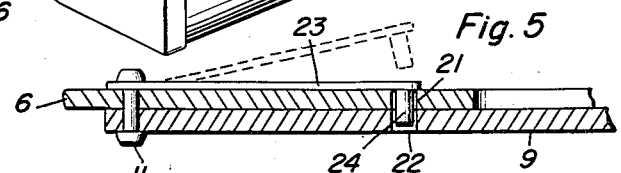
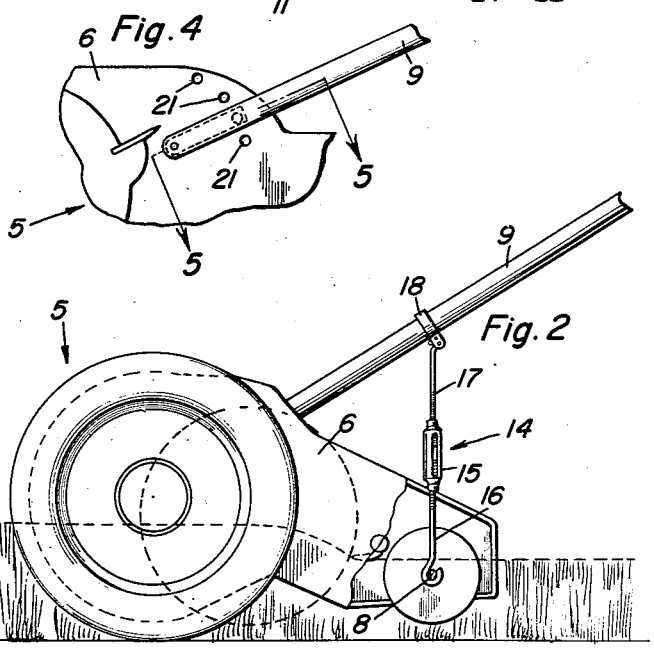
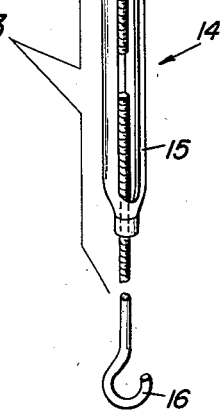
August Nadler
INVENTOR.

United States Patent Office 2,796,718
Patented June 25, 1957

2,796,718
LAWN MOWER HANDLE ATTACHMENT
August Nadler, Macopin, N. J.
Application February 25, 1955, Serial No. 490,453
1 Claim. (Cl. 56—249)

The present invention relates to new and useful improvements in lawn mowers, particularly of the hand propelled type, and has for its primary object to provide, in a manner as hereinafter set forth, novel means for eliminating the usual lost motion or play between the pivotally connected handle and the head of the machine, thereby facilitating elevating the roller, cutting assembly, etc., as desired and transferring substantially all of the weight to the two wheels for permitting the machine to be pushed with less effort, in addition to allowing either wheel to be more readily raised from the ground when trimming.

Another very important object of the invention is to provide a mower of the aforementioned character comprising means for expeditiously adjusting the handle to accommodate operators of different heights.

Other objects of the invention are to provide an improved lawn mower of the character described which will be comparatively simple in construction, strong, durable, highly efficient and reliable in operation and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view, showing an embodiment of the invention on a lawn mower;

Figure 2 is an enlarged view in side elevation thereof, a portion of the mower being broken away;

Figure 3 is an enlarged perspective view of the device;

Figure 4 is a fragmentary view in side elevation of another embodiment of the invention; and Figure 5 is an enlarged sectional view, taken substantially on the line 5—5 of Figure 4.

Referring now to the drawing in detail, it will be seen that reference character 5 designates generally the head of a hand propelled lawn mower comprising side plates 6 having a ground roller 7 rotatably mounted between the rear end portions thereof on an axle or shaft 8. The arms 9 of a handle 10 are pivotally secured, as at 11, to the side plates 6 of the machine. The side plates 6 include the usual marginal flanges 12 having slots 13 therein in which the arms 9 are operable and which limit the swinging movement of the handle 10.

Adjustable rods 14 connect the ground roller 7 to the arms 9 to be lifted with the handle 10. Toward this end, the adjustable rods 14 include turnbuckles 15 comprising hooks 16 on the lower ends thereof for reception of the end portions of the roller shaft or axle 8. The turnbuckles 15 further include, on the upper ends thereof, oppositely threaded screw eyes 17 which are connected to substantially U-shaped resilient clamps 18 adjustably mounted on the handle arms 9. Bolts 19 secure the clamps 18 in adjusted position on the arms 9. Extending through the lower end portions of the clamps 18 are bolts 20 which pass through the screw eyes 17 for connecting the turnbuckles 15 to the clamps 18.

It is thought that the operation of the invention will be readily apparent from a consideration of the foregoing. Briefly, the clamps 18 are mounted on the handle arms 9 and the hooks 16 are engaged beneath the end portions of the roller axle 8. The upper ends of the turnbuckles 15 are connected at 20 to the clamps 18 and said turnbuckles and then tightened to draw the mower handle and roller toward each other. The bolts 19 are then tightened for firmly securing the clamps 18 in position on the arms 9 and the mower is ready for operation. As will be readily apparent, vertical swinging movement of the handle 10 independently of the head 5 of the machine is now positively prevented. Thus, to elevate the ground roller and the cutting mechanism for any reason, it is only necessary to swing the handle 10 upwardly in an obvious manner. This is shown to advantage in Figure 2 of the drawing.

In the embodiment of Figures 4 and 5 of the drawing, the side plates 6 of the mower 5 have formed therein arcuate series of spaced openings 21 which are concentric with the pivots 11 of the arms 9. Then, the arms 9 have formed therein openings 22 (see Figure 5) to be brought selectively into registry with the openings 21. Mounted for swinging adjustment at 11 on the side plates 6 are resilient latches 23 comprising, on the free end portions thereof, pins 24 which are engageable in the aligned openings 21 and 22 for positively securing the handle 10 in adjusted position against vertical swinging movement independently of the head of the machine.

To adjust the handle 10 to accommodate operators of different heights, the resilient latch 23 is retracted to the dotted line position of Figure 5 of the drawing. The handle 10 is then swung upwardly or downwardly to align the openings 22 with the desired openings 21. The latch 23 is then released and engaged in the aligned openings for locking the handle in adjusted position. The lowermost opening 21 is below the swinging range of the handle arms 9. When it is desired to permit the handle 10 to swing on the head of the machine in the usual manner and the locking means is not to be used, the pin 24 of the latch 23 is engaged in the lowermost opening 21.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claim.

What is claimed as new is as follows:

An attachment for lawn mowers of the type including a head comprising side plates, a ground roller including an axle journaled on the side plates, and a handle comprising arms having longitudinal portions pivotally secured to said side plates, said attachment comprising: a pair of substantially U-shaped resilient clamps adjustably mounted on said longitudinal arm portions and depending therefrom, bolts connecting the legs of said clamps, and turnbuckles having one end connected to the axle and their other ends connected to said bolts for adjustably and positively securing the handle against swinging movement on the head, said turnbuckle including hooks on one end engaged with the axle and screw eyes on their other ends, said bolts passing through said screw eyes.

References Cited in the file of this patent

UNITED STATES PATENTS

| | | |
|---|---|---|
| 930,428 | Stapleton | Aug. 10, 1909 |
| 1,482,432 | Hildebrand | Feb. 5, 1924 |
| 2,532,813 | Hussey et al. | Dec. 5, 1950 |
| 2,629,222 | Johnston | Feb. 24, 1953 |